United States Patent Office 2,910,184
Patented Oct. 27, 1959

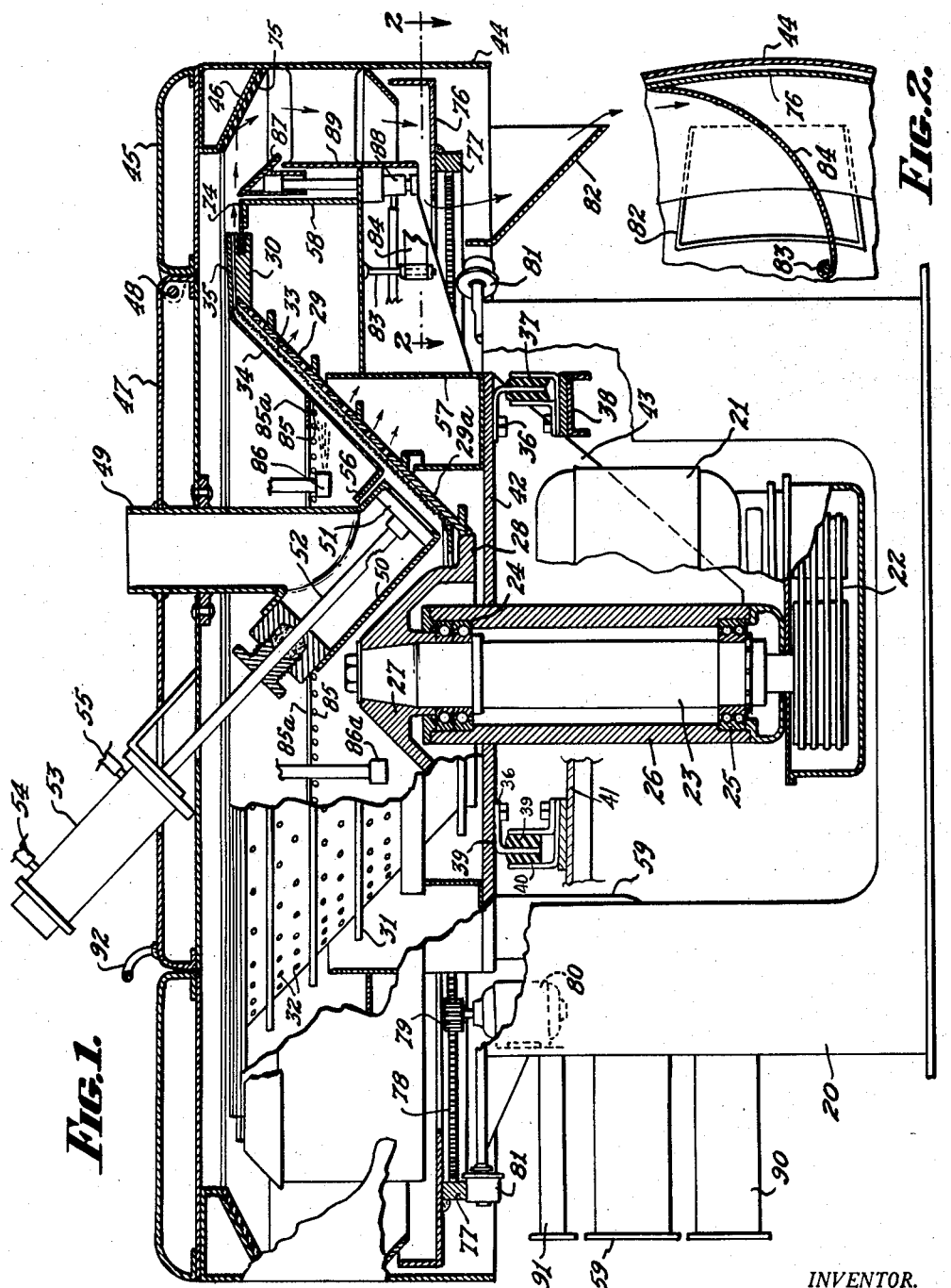

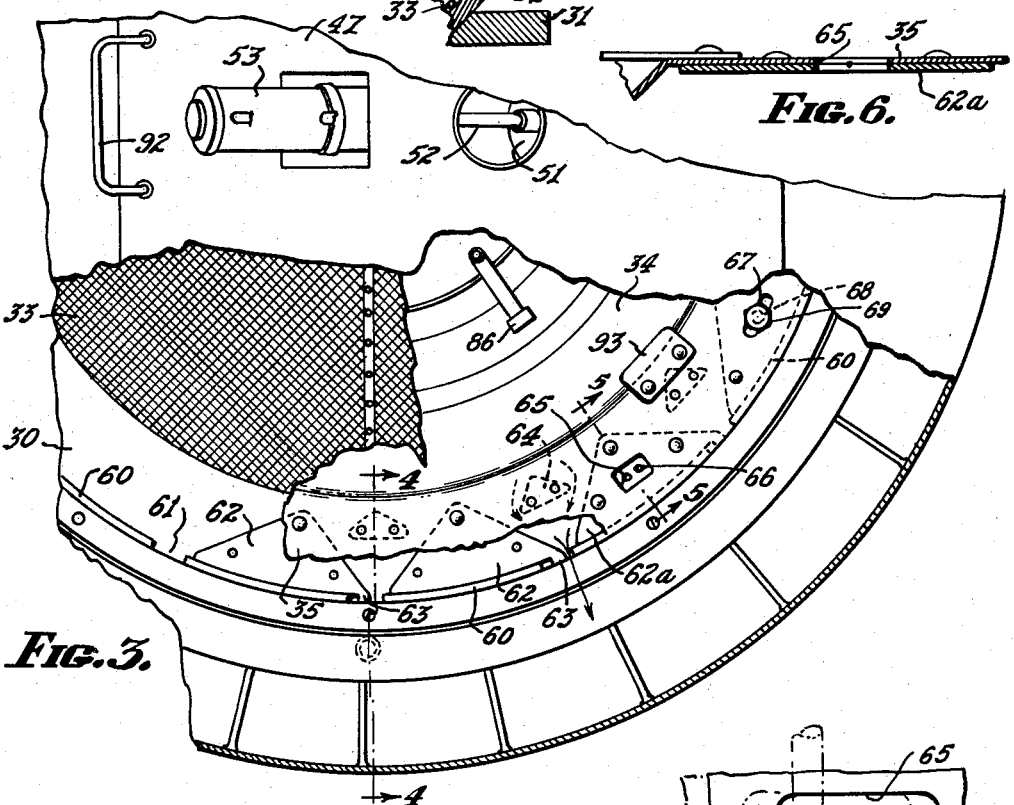

2,910,184

CENTRIFUGAL SEPARATOR

Philippe P. Strich, Cincinnati, Ohio

Application September 30, 1957, Serial No. 687,198

12 Claims. (Cl. 210—371)

My invention resides in the provision of an improved centrifugal separator by which the liquid of a solid-liquid mixture is continuously separated from the mixture so as to present the solids to a convenient receptacle.

A very important object of my invention is to provide a centrifugal separator in which the retention time of the liquid-solid mixture in the separator during the separating time may be easily varied in accordance with the requirements of the mixture and the type of solids involved, as well as the desired condition of the solids extracted.

It is also an important object of my invention to provide a centrifugal separator having a loading mechanism which will insure a quick loading of the separator and which will maintain a constant volume of material within the separator during the separation process.

It is a further object of my invention to provide a centrifugal separator which is extremely efficient and which is capable of handling a wide variety of liquid-solid mixtures.

Yet another object of my invention is to provide a centrifugal separator which is efficient in operation, economical to manufacture, simple to operate and of rugged strength.

My invention embraces that type of mechanism including an outer perforate inverted cone, an inner substantially imperforate cone and a screen between the two cones, the liquid-solid mixture being introduced near the lower end of the outer cone and the combination of cones and screen being rotated rapidly so that the solids will move up the screen towards the periphery of the cones while the liquids strike through the screen and perforate outer cone. It is highly desirable to be able to vary the speed with which the solids move towards and are discharged from the cone periphery. To this end my invention includes novel discharge orifices or nozzles which may be readily and easily varied according to the requirements of the liquid-solid mixture so that either the discharge orifices are restricted whereby to maintain the liquid-solid mixture under influence of centrifugal separation for a greater length of time or to make the discharge orifices or nozzles larger whereby to permit the solids to flow from the separator at a greater rate of speed thus subjecting the liquid-solid mixture to centrifugal separation for a shorter length of time. It is also highly desirable to have means by which a constant volume of material to be separated may be maintained within the unit taking into account the fact that the length of time to which various mixtures will be subjected to centrifugal separation will vary.

It is to the accomplishment of the above objects that my invention is directed. Other objects and advantages of the invention will undoubtedly become apparent during the course of the following description and with reference to the accompanying drawings, in which drawings like numerals are employed to designate like parts and in which:

Figure 1 is an elevational view of my novel centrifugal separator, with parts broken away and parts in section, Figure 2 is a section on the line 2—2 of Figure 1, Figure 3 is a fragmentary plan view of my improved centrifugal separator with parts broken away, Figure 4 is a section taken on the line 4—4 of Figure 3, Figure 5 is an enlarged section taken on the line 5—5 of Figure 3, Figure 6 is a fragmentary sectional view of the flange of the inner cone of my centrifugal separator, Figure 7 is a fragmentary detail of means for shifting the flanges of the outer and inner cones with respect to one another, Figure 8 is a perspective view of the tool employed with the arrangement of Figure 7, Figure 9 is a plan view of the restrictive means employed with the cone flanges to define discharge orifices or nozzles, and Figure 10 is a perspective view of one of the rubber mounting members.

Referring now to the drawings, particularly Figure 1, a portion of the main frame is indicated at 20. Based within the frame 20 in conventional manner is a motor 21 which through multiple belts 22 drives a vertical spindle 23 having upper and lower bearings 24 and 25 located within a tubular frame section 26. A member 27 is fixed to the upper end of the spindle 23, such member 27 having a depending skirt terminating in a horizontal flange 28. The member 27 rotates with the spindle 23.

Fixed to the flange 28 of the member 27 is a perforated basket 29 which is in the general shape of an inverted frustum. At its upper end the inverted frustoconical basket 29 terminates in a horizontal flange 30. Reinforcing rings 31 around the outside of the basket 29 give it added strength. A major part of the basket 29 has a plurality of evenly spaced perforations 32 provided therein. The lower part of the basket, however, as indicated at 29a, is imperforate as will be described in greater detail shortly.

Fixed to the inner face of the basket 29 is a screen 33. Preferably this screen is one which is fabricated electrolytically out of various metals so that it presents a polished surface having conical holes in any size or shape desired up to 0.001" in diameter. Although relatively new, such screens are now known to the art. In any event it will be understood that the inner face of the basket 29 is covered by a screen-like member 33 having a great number of evenly spaced relatively small perforations therein.

Disposed within the basket 29 is a substantially imperforate, frusto-conical member 34 terminating upwardly in a horizontal flange 35. The member 34 is supported within the member 29 so as to leave a space between the inner face of the member 34 and adjacent face of the screen 33. This member 34 is actually supported within the member 29 by coaction of the flanges 30 and 35 as will be described in greater detail further along in this description.

Most of the basic mechanism, including much of that which has already been described, is rubber mounted. In general this is accomplished by means of a bracket 36 fixed within a rubber member 37 which is in turn mounted on a frame member 38 which will be understood to be connected to the base frame 20. There is also a rubber member 39 mounted in a suitable retainer 40 which is in turn fixed to another frame member 41 in the base frame 20. The rubber support members 39 and 37 (these are identical and preferably there are at least three of them) support the base plate 42. A plurality of webs, one of which is shown at 43, extend beneath the underside of the plate 42 and the vertical sleeve 26 in which the shaft or spindle 23 is mounted as earlier described. The motor 21 may also have an additional connection to one of these webs 43. In this manner it will be observed that the motor 21, spindle 23, outer basket 29, screen 33 and inner member 34 are all rubber mounted deriving their support from the plate 42 and eventually the rubber-biased bracket 36 and rubber member 39.

Also deriving its support from the base plate 42 is the upper frame housing 44. A top section 45 is fixed to the housing 44 by means of brackets 46. A central section of the machine top is indicated at 47 and has a hinged connection 48 with the fixed top section 45. The top sections 45 and 47 are of double thickness and may contain insulation if desired.

The loading mechanism includes an inlet slurry conduit 49 which is fixed to the top section 47. The conduit 49 joins another conduit 50 the lower end of which is parallel to the basket 29 and screen 33. A closure member 51 is provided for the tube 50 and this closure member is connected to a rod 52 which extends through conventional bearings and packing material to a cylinder 53 wherein it connects with the piston rod of a piston reciprocable in the cylinder 53, this latter mechanism not being shown in detail. Fluid connections to the cylinder 53 are indicated at 54 and 55 and it will be understood that according to the reciprocation of the piston within this cylinder the closure member will be moved either to its closed position as indicated in Figure 1 or withdrawn to a position wherein slurry from the conduit 49 may flow through the tube 50 into the basket 29.

The arrangement of the tube 50 with respect to the basket 29 is important. By having the slurry directed at right angles to the wall of the rotating basket 29 there will immediately be formed a plug of slurry which will be frusto-conical in shape, as wide as the diameter of the tube 50 and as thick as the space between the end of this tube and the screen 33. This plug, which is formed by the centrifugal action of the rotating basket 29, will prevent entrance of further amounts of slurry until such time as the liquids and solids, by centrifugal action, move up along the screen 33 between it and the inner member 34. As such material moves from the plug it is immediately replaced by additional slurry so that in effect the end of the tube 50 is always blocked by a plug of slurry so that a constant amount of material is maintained within the basket 29. The lower end of the inner, substantially imperforate basket 34 is provided with a flange 56 to receive the lower end of the tube 50.

With the closure member 51 moved to its open position, slurry will be introduced to the lower part 29a of the basket member through the conduit 49 and tube 50. The rapid rotation of the basket 29 along with the screen 33 and inner member 34 sets up a centrifugal action which tends to throw the solid-liquid mixture against the screen 33 and at the same time to push this mixture upwardly of the inverted frustums. As this slurry so rises the liquid will strike through the screen 33 and the perforations 32 of the basket 29. The solid will continue to move up along the screen 33 between it and the inner member 34. The liquids which strike through the basket 29 may be collected in a pair of tub members 57 and 58 supported from the base plate 42. Such liquids may be removed from the tubs through a conduit 59 and lead from the machine. When the solids reach the top of the screen 33 they will be urged outwardly between the flanges 30 and 35 of the outer and inner frustums respectively by the centrifugal forces created.

Referring now especially to Figures 3, 5, 6 and 9 the flange and discharge orifice or nozzle arrangement will be described. The outer end of the upper surface of the flange 30 comprises an upstanding shoulder or rim 60. This shoulder or rim 60 is perhaps best seen in Figures 3 and 5. Such rim is interrupted at a plurality of evenly spaced places to provide passageways 61. The flange 35 of the inner member 34 engages the upstanding rib 60 on the flange 30 of the outer member 29. The interruptions in the rim 60 define openings 61 between the outer ends of the flanges 30 and 35. It is to the control of the widths of these outlet passages 61 that one facet of this invention is directed.

Fixed at evenly spaced intervals to the underside of the flange 35 are a plurality of gate control members 62 which are of general triangular configuration and which have surfaces to engage the inner face of the upstanding rim 60 on the lower flange 30. From that curved surface on each of the members 62 which engages or is closely adjacent the rim 60 is a projection 63 which extends from the curved surface of the member 62 a distance equal to the thickness of the rim 60 of the flange 30. The members 62 serve to direct the solids moving from the screen 33 between the flanges 35 and 30 towards the cut-out portions forming the orifices 61 in the rim 60. Additional members 64, which may be fixed to either of the flanges 30 or 35, prevent the solids from packing too tight between the members 62 and prevent too much force from being concentrated on the solid particles as they are discharged through the passageways 61.

It will be apparent that the effective widths of the passageways 61 is determined by the relative position of the members 62 and their projections 63 with the upstanding rim portions 60. It will also be apparent that since the members 62 are fixed to the under side of the flange 35 of the inner cone-like member 34 and since the rim portions 60 are struck upwardly from the flange 30 of the outer cone-like basket 29, the width of the passages 61 may be varied by shifting the flanges 30 and 35 with respect to one another. One way of accomplishing this is as follows, as perhaps best seen in Figures 3, 5, 7 and 8. An opening 65 is cut in the upper flange 35 and one of the substantially triangular members 62, that being selected being designated 62a. A pair of holes 66 are provided in the lower flange 30 in the region of the opening 65. A plurality of slots 67 are provided in the flange 35, a plurality of threaded openings are provided in the lower flange 30 and bolts 69 may pass through the slots 67 into the threaded aperture 68 to hold the flanges in desired fixed position.

In order to shift the flanges 35 and 30 with respect to one another so as to increase or decrease the effective width of the passageways 61 as governed by the projections 63 on the members 62, one will first loosen the bolts 69. One may then employ a tool such as is shown in perspective in Figure 8 and which comprises a rod 70 bent at right angles to define a vertical portion 71 to which is fixed an eccentric 72. Should the lower end of the rod portion 71 be placed within the left-hand hole 66, as viewed in Figure 7, of the flange 30 so that the eccentric 72 will lie within the cut-out portion 65 of the flange 35 and member 62a, clockwise rotation of the arm 70 will cause the flange 35 and member 62a to be moved to the left as viewed in Figure 7. The result of such movement is shown in dotted lines in that figure. Considering Figure 3 in the same light as just described in connection with Figure 7, placing the tool portion 71 in the left-hand opening 66 and moving the arm 70 in a clockwise direction will move all of the members 62 in a clockwise direction, this acting to move the member 63 in such a way as to increase the effective width of the discharge passages 61. Obviously, when the flange 35 and members 62 have been moved to provide the desired effective widths of the passages 61, the bolts 69 may be tightened so as to hold the flanges 30 and 35 in the desired selected position.

The effective widths of the discharge passages, as governed by the relationship between the members 62—63 and the upstanding rim portions 60, determines the length of time that the slurry is subjected to the centrifugal forces set up by the rotating frustums 29 and 34. When the effective widths of these orifices 61 are relatively wide, the solids may more easily be discharged from between the flanges with the result that the slurry is subjected to centrifugal forces for a shorter time. When the effective width of the orifices 61 is lessened, the solids cannot escape so easily, with the result that the slurry is subjected to the centrifugal forces for a somewhat longer time. The solids which are discharged through these orifices 61, which together with the members 62 and rim portions 60 may be thought of as determining exit nozzles, are collected in a manner shortly to be described.

At this point it is well to note that my centrifugal separator does not push or retain the slurry in process by mechanical pushers or revolving screws so often found in other separators and which under high pressures damage the crystals and granules removed from the slurry. This design results in a more economical machine to manufacture and in a machine which has a low power consumption since no power is required to discharge the solids, this being left to the centrifugal forces set up in the rotating cone-like members and as governed by the effective width of the discharge nozzles 61.

Also, I contemplate arranging the basket 29, screen 33, inner member 34 and loading tube 50 so that only a relatively very thin layer of product, for example, from ⅛ inch to ⅜ inch thick, depending on the solid size, is produced and spun. This makes possible a very quick separation with a minimum of pressure between the solid particles and also less pressure against the screen, which makes for longer screen life. This thin layer combined with the almost free motion of the materials as they move upwardly along the screen under the force of the centrifugal action accounts for perseverance in crystal shape which I obtain. Also, the loading tube 50 and its relationship to the basket 29 insures a constant volume of produce, as earlier described, which keeps the apparatus in good balance.

Referring now particularly to Figures 1 and 5, I have included means for insuring proper rotation of the inverted cones 29 and 34 with a minimum of material loss. This I have at least in part accomplished by providing the flange 30 of the cone 29 with a peripheral groove 73. The frame, tub defining section 58 has a member 74 which is received within this groove 73. This arrangement of the member 74 extending into the horizontal, peripheral groove 73 provides an excellent sealing arrangement.

Referring now also to Figures 1 and 4, I have illustrated by means of arrows the path which will be taken by the solid particles which are discharged from the machine through the orifices or nozzles 61 as governed by the position of the abutments 62—63 with respect to the upstanding rim sections 60. Preferably these solid particles as they are discharged from the cones by centrifugal action, strike a rubber bumper or pad 75 which may conveniently be fastened to the bracket 46. The rubber pad 75 prevents the particles from being damaged.

Preferably the solid particles are collected in a rotating pan 76. I have illustrated the pan 76 as having a depending flange to engage a plurality of rollers mounted in the base frame 20. The depending flange 77 bears an internal gear 78 which is engaged by a pinion gear 79 on a motor 80 fastened in the frame. The flange engaging rollers are generally indicated at 81.

Means are provided for moving the solid particles from the rotating catch pan 76 to a chute 82 for directing the particles to collecting vehicles as desired. To this end I fasten a rod 83 to the frame subsection 58. Fixed to the rod 83 is a vertical, arcuate scraper blade 84 which extends across the bottom of the pan 76 in close engagement therewith. As the pan 76 is rotated, the solid materials will be brought against the scraper blade 84 and caused to move off the catch pan 76 into the chute 82 as perhaps best illustrated in Figures 1 and 2.

I have also included means for washing out the cones and screen rapidly and efficiently and other means for washing the products to be purged during the centrifugation process. The product washing means includes a row of orifices around the inner cone member 34 as indicated at 85 beneath a horizontal flange 85a. A water injection nozzle may extend within the inner cone in the region of the orifices 85 as indicated at 86. When it is desired to wash the product being purged, water may be introduced by the injection unit 86 within the cone 34, such water being forced by centrifugal action and the guide flange 85a through the orifices 85 and against the product along the screen 33. The cone and screen washing means includes the spray nozzle 86a located at the same level as the loading pipe 58. Water from the nozzle will take the same path through the cones and discharge orifice 61 as do the solid particles. In this case, however, it is not desired for water to reach the catch pan 76. Accordingly I provide a member 87 which may be moved under influence of a small cylinder and piston generally indicated at 88 so as to block the path of the water coming from between the flanges 30 and 35. This position is indicated in dotted lines in Figure 4. The water striking the member 87 will be received in the stationary area between the frame tub wall 58 and section 89 and thereafter be collected for discharge through one of the conduits 90, 59 and 91 best seen at the left side of Figure 1.

In Figures 1 and 3 it will be observed that I have provided suitable handles 92 and 93 for manipulating the top or lid 47 of the machine and also to aid in moving the cone flanges 30 and 35 with respect to one another.

It is believed that the operation of the machine of this invention has been made clear from the foregoing description. Briefly, however, the slurry is introduced through the conduit 49 when the gate 51 is moved to its open position. The cones 29 and 34 are rotated rapidly together. The slurry moves up the screen 33 with the water striking through the perforations 32 of the cone 29 and with the solid particles continuing up the screen 33 until they are discharged through the regulatable orifices 61 between the flanges 30 and 35. The solid particles are thrown against the rubber bumpers 75 and dropped onto the rotating catch pan 76 whereafter they are scraped by the arcuate blade 84 into the chute 82. During this time the member 87 is in the position shown in full lines in Figures 1 and 4. The length of time to which the slurry is subjected to the centrifugal forces set up by the rotating cones is regulated by the size of the discharge orifices 61. When these are relatively large the solid materials are able to leave the cones more quickly with the result that the centrifuge time is shortened. When the orifices 61 are relatively restricted the slurry is subjected to a longer centrifuge action. The type of slurry and the type of end product desired will guide the operator as to what type of restrictive nozzle 61 is desired. This may easily be effected by loosening the bolts 69 and sliding the flanges 30 and 35, and their respective cones, with respect to one another so as to change the relative position of the members 62—63 and rim sections 60—61. Efficient wash-out of the mechanism may be obtained by introducing water through the unit 86a and moving the member 87 to the dotted line position of Figure 4, rotation of the cones 29 and 34 being maintained during this time.

Although I have described my invention as embodied in certain particular structures and arrangements, it will be apparent to those skilled in the art that changes in these structures and arrangements may be made without departing from the scope and spirit of this invention. It is also to be understood that these structures and arrangements are exemplary only and I do not intend to be limited to them except insofar as they are specifically set forth in the subjoined claims.

Having thus described this invention, what I claim as new and what I desire to protect by United States Letters Patent is:

1. A centrifugal separator comprising a base frame, a first inverted frustum of a cone having a plurality of perforations therein, a screen fixed to the inner face of said first frustum, a second inverted frustum of a cone depending within said first frustum and spaced from said screen, loading mechanism for introducing a slurry to be centrifuged near the lower end of said first frustum, means to rotate said first and second frustums and said screen together as a unit within said base frame, abutments connected to said frustums adjacent the upper ends thereof so as to define a series of discharge orifices for material discharged between said frustums, and other means to rotate said frustums relative to one another whereby to vary the size of said discharge orifices by varying the spacing between said abutments.

2. The separator of claim 1 in which each of said frustums has a substantially horizontal flange extending from the upper end thereof, said abutments being located between said flanges and engaging same whereby to space said second frustum from said screen.

3. The separator of claim 2 in which some of said abutments comprise ribs located at evenly spaced positions adjacent the perimeter of one of said flanges, and others of said abutments comprising lug members on the other of said flanges closely adjacent the inner faces of said ribs and extendible variable amounts beyond the ends of said ribs when said frustums are rotated relative to one another.

4. The separator of claim 2 in which some of said abutments comprise ribs located at evenly spaced positions adjacent the perimeter of one of said flanges, and others of said abutments comprising lug members on the other of said flanges closely adjacent the inner faces of said ribs and having projections extending beyond the ends of said ribs, whereby the closer said projections are brought to the ends of said ribs the wider are the discharge orifices thereby defined.

5. The separator of claim 4 in which said lug members comprise substantially triangular members having bases adjacent said ribs.

6. The separator of claim 5 including additional abutments located between pairs of said lug members and spaced from said ribs.

7. The separator of claim 1 in which said loading mechanism includes a discharge spout parallel to said screen whereby said slurry is directed at right angles to said screen.

8. The separator of claim 1 including a resilient pad against which solid particles passing through said discharge orifices strike.

9. The separator of claim 1 including a rotatable pan to catch solid particles centrifuged from said separator and means to rotate said pan.

10. The separator of claim 1 including a nozzle for introducing water within said frustums and guard means to prevent water centrifuged from said separator from contacting solid particles previously centrifuged therefrom.

11. A centrifugal separator comprising a base frame, an inverted frusto-conical perforated basket member rotatably mounted within said base member, a fine mesh screen fixed to the inner face of said basket member, a substantially imperforate frusto-conical member depending within said basket member and spaced parallel to said screen, means to rotate said frusto-conical members and said screen as a unit, loading means to introduce a slurry into the lower regions of said basket member, a horizontal flange extending from the top of each of said frusto-conical members, a plurality of evenly spaced arcuate ribs upstanding about the periphery of the lower of said flanges, the spaces between pairs of said ribs comprising discharge orifices, a plurality of generally triangular members fixed on said upper flange and having bases shaped to engage said ribs, said triangular members and said ribs engaging both of said flanges whereby to maintain said frusto-conical members spaced from one another, and means to shift said flanges with respect to one another whereby to vary the width of said discharge orifices depending on the position of said triangular members with respect to the ends of said ribs.

12. A centrifugal separator comprising a base frame, an inverted frusto-conical perforated basket member rotatably mounted within said base member, a fine mesh screen fixed to the inner face of said basket member, a substantially imperforate frusto-conical member depending within said basket member and spaced parallel to said screen, means to rotate said frusto-conical members and said screen as a unit, loading means to introduce a slurry into the lower regions of said basket member, a horizontal flange extending from the top of each of said frusto-conical members, a plurality of evenly spaced arcuate ribs upstanding about the periphery of the lower of said flanges, the spaces between pairs of said ribs comprising discharge orifices, a plurality of generally triangular members fixed on said upper flange and having bases shaped to engage said ribs, said triangular members and said ribs engaging both of said flanges whereby to maintain said frusto-conical members spaced from one another, lugs extending from said shaped bases of said triangular members between pairs of said ribs and past the ends of said ribs, and means to shift said flanges with respect to one another whereby to vary the width of said discharge orifices depending on the position of said lugs with respect to the ends of said ribs.

References Cited in the file of this patent

UNITED STATES PATENTS

| | | |
|---|---|---|
| 536,298 | Rockman | Mar. 26, 1895 |
| 1,122,460 | Anderson | Dec. 29, 1914 |
| 2,750,040 | Strich | June 12, 1956 |